United States Patent

Wang

[11] Patent Number: 5,998,900
[45] Date of Patent: Dec. 7, 1999

[54] RETAINING RING OF A SHAFT

[75] Inventor: Kuo-Jen Wang, Taoyuan, Taiwan

[73] Assignee: Darfon Electronics Corp., Taoyuan, Taiwan

[21] Appl. No.: 09/219,666

[22] Filed: Dec. 23, 1998

[30] Foreign Application Priority Data

Aug. 29, 1998 [TW] Taiwan .................................. 87214223

[51] Int. Cl.$^6$ .................................................. H02K 5/00
[52] U.S. Cl. ................................ 310/91; 310/91; 310/90; 310/67 R
[58] Field of Search .............................. 310/90, 91, 67 R

[56] References Cited

U.S. PATENT DOCUMENTS

| | | | |
|---|---|---|---|
| 3,592,517 | 7/1971 | Harris | 384/215 |
| 5,059,844 | 10/1991 | Anstine | 310/90 |
| 5,473,212 | 12/1995 | Crook et al. | 310/221 |
| 5,559,320 | 9/1996 | Loya | 235/467 |
| 5,623,382 | 4/1997 | Moritan et al. | 360/99.08 |
| 5,678,851 | 10/1997 | Saito et al. | 280/728.3 |
| 5,723,927 | 3/1998 | Teshima | 310/90 |
| 5,726,513 | 3/1998 | Lyle et al. | 310/91 |

*Primary Examiner*—Nestor Ramirez
*Assistant Examiner*—Saeed Ghahramani
*Attorney, Agent, or Firm*—Majestic, Parsons, Siebert & Hsue P.C.

[57] ABSTRACT

A retaining ring for use with a shaft is provided. The retaining ring is in shape of a thin plate and includes a plurality of pedal-like portions with any two adjacent pedal-like portion being connected to each other by a deformable connection portion. The plurality of pedal-like portions defines a channel at the center of the retaining ring for passage of the shaft. As the shaft enters the channel, the connection portion deforms in response.

3 Claims, 2 Drawing Sheets

RETAINING RING OF A SHAFT

FIELD OF INVENTION

The present invention relates to a retaining ring for use with a shaft and, in particular, a retaining ring for use with a shaft within a motor.

BACKGROUND OF INVENTION

As well known in the arts, a precision motor is usually provided in a data reading apparatus, e.g. a compact disc player. In general, this motor, as shown in FIG. 1, includes rotor members and stator members. The rotor members include a shaft 10, a rotor 12 and the magnet 14 therein. During operation, above mentioned three members proceed the high speed rotation along the axis of the shaft 10. The stator members include the coils 16, a base plate 17, a circuit board 18, a bush 19, a rear cap 15 and a pivot plate 13.

During operation of the motor, to prevent the detachment of rotor from the stator, in general, a retaining ring 11 is provided at the end of the shaft 10. This retaining ring 11 may attach to the shaft 10 by press fit relationship. Or, alternatively, by an engagement approach, the retaining ring 11 is engaged with a corresponding groove on the shaft 10.

Typically, the aforementioned shaft 10, rotor 12, magnet 14, coils 16, base plate 17, circuit board 18, bush 19 are first assembled together. Afterwards, the retaining ring 11 is disposed at the end of the rotor. In succession, the rear cap 15 is assembled to the pivot plate 13 such that the rear cap 15 is in press-fit with the base plate 17.

The retaining ring 11 may be in form of "C" shape with a narrow slot thereon. Alternatively, the retaining ring 11 may be in form of a press-fit closed ring. Due to the existence of the retaining ring 11 touching against the bushing 19 as the shaft 10 is pulled by an external force, the shaft 10 will not be pulled out of the motor. However, the retaining ring 11 is in high speed rotation together with the shaft 10. Therefore, should a small amount of eccentric phenomenon with regard to the weight distribution of the retaining ring 11 exists, adverse effect is imposed over the high speed rotation of the shaft 10.

SUMMARY OF INVENTION

To the mentioned defects, the invention provides a novel retaining ring which is stationery while being capable of fulfilling basic function of the retaining ring.

Even a small amount of eccentric phenomenon with regard to the weight distribution of the retaining ring exists, no adverse effect is imposed over the high speed rotation of the shaft.

The retaining ring is in shape of a thin plate and includes a plurality of pedal-like portions with any two adjacent pedal-like portion being connected to each other by a deformable connection portion. The plurality of pedal-like portions defines a channel at the center of the retaining ring for passage of the shaft. As the shaft enters the channel, the connection portion deforms in response.

DETAILED DESCRIPTION OF THE INVENTION

Figure 2:
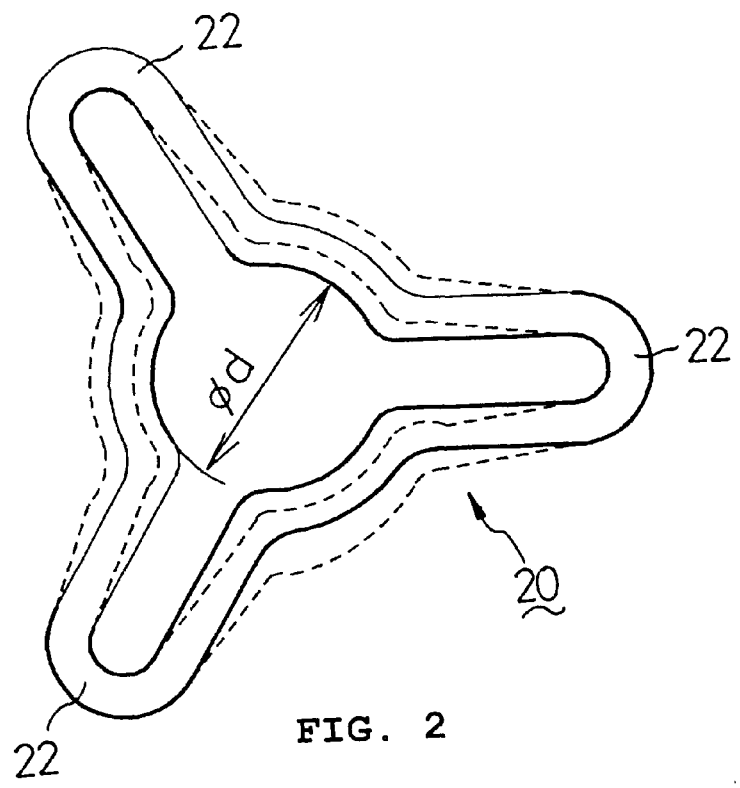
FIG. 2 shows the top view of the retaining ring according to the invention.

As shown in FIG. 2, the retaining ring 20 is in shape of a thin plate and includes a plurality of pedal-like portions 22 with any two adjacent pedal-like portion 22 being connected to each other by a deformable connection portion. The embodiment uses a three pedal-like portions 22. The plurality of pedal-like portions defines a channel at the center of the retaining ring for passage of the shaft. As the shaft enters the channel, the connection portion deforms in response. While unstressed, the diameter of the channel is $\phi d$ and as the shaft is inserted into the channel, the retaining ring 20 deforms into the status shown in broken line in FIG. 2. It is noted that, as the retaining ring 20 engages with the corresponding groove provided on the shaft 10 shown in FIG. 3, the retaining ring 20 resumes its original shape indicated by the solid line shown in FIG. 2.

Figure 1:
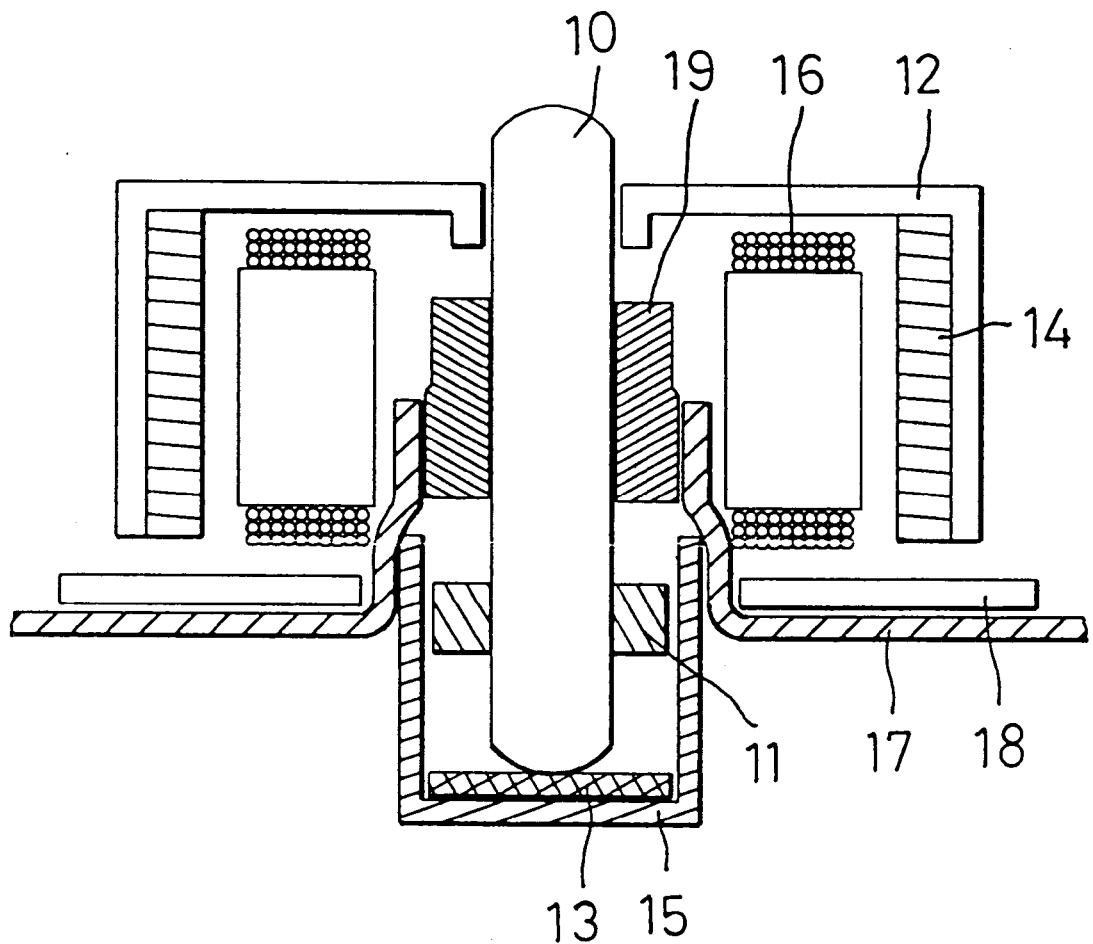
FIG. 1 shows the sectional view of prior art motor.
Figure 3:
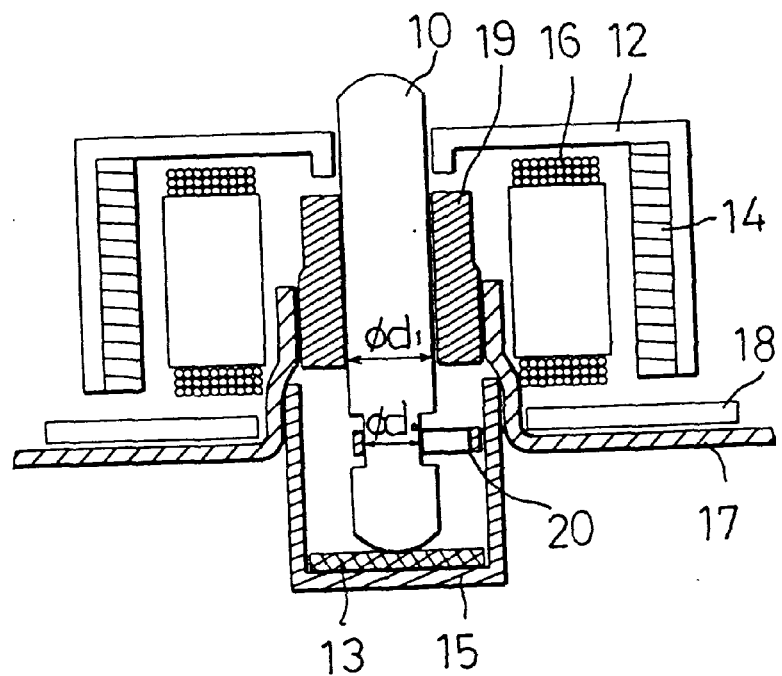
FIG. 3 shows the sectional view of the motor in accordance with the invention.

In FIG. 3, the sectional view of the motor of the invention after assembly is shown. In FIG. 3, the elements denoted as like numeral with that in FIG. 1 perform the same function. The assembly process is recited below. First, the coils 16, the circuit board 18, the base plate 17, the bush 19, the retaining ring 20, the rear cap 15 and pivot plate 13 are assembled. Afterwards, the shaft 10, together with the rotor 12 and the magnet 14, is inserted into the channel of the retaining ring 20. At the same time, the inner edge of the connection portion of the retaining ring 20 engages with the groove of the shaft 10.

From FIG. 3, it is known the relationship of the inner diameter $\phi d$ with respect to the diameters of the shaft 10 is $\phi d0 < \phi d < \phi d1$. $\phi d1$ is the shaft diameter of shaft 10 and $\phi d0$ is diameter of the neck of the shaft 10 at location corresponding to the groove. Therefore, after assembly, the retaining ring 20 functions to limit upper movement of the shaft 10.

It is worthy to note that the retaining ring 20 does not attach to the wall of the shaft in the present invention. During high speed rotation of the shaft 10, the retaining ring 20 does not rotate in response. As a result, the shape or weight distribution of retaining ring 20 does not affect the rotation of the shaft 10. This is advantageous to the prior arts.

Furthermore, except during assembly process, the retaining ring of the invention experiences no stress during its life operation, the life cycle is therefore longer than that of the prior art retaining ring.

In a preferred embodiment, this retaining ring may be made by punch press process on the plastic material or on a metal sheet material with good ductility.

What is claimed is:

1. A closed-form retaining ring for use with a shaft, the closed-form retaining ring being in shape of a thin plate and including a plurality of evenly-distributed pedal-like portions with two adjacent pedal-like portions being connected to each other by a deformable connection portion to form the closed-form retaining ring, the plurality of pedal-like portions defining a channel at the center of the retaining ring for passage of the shaft.

2. The retaining ring of claim 1, wherein the shaft is a motor's shaft.

3. The retaining ring of claim 1, wherein, as the shaft enters the channel, the connection portion deforms in response.

* * * * *